(12) United States Patent
Miwa

(10) Patent No.: US 7,962,669 B2
(45) Date of Patent: Jun. 14, 2011

(54) MEMORY CONTROLLER AND MEMORY CONTROL METHOD

(75) Inventor: Hideyuki Miwa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 12/614,845

(22) Filed: Nov. 9, 2009

(65) Prior Publication Data

US 2010/0057952 A1    Mar. 4, 2010

Related U.S. Application Data

(62) Division of application No. 11/634,120, filed on Dec. 6, 2006, now abandoned.

(30) Foreign Application Priority Data

Dec. 8, 2005   (JP) ................................. 2005-354512

(51) Int. Cl.
*G06F 3/00* (2006.01)
*G06F 13/00* (2006.01)
(52) U.S. Cl. .................. 710/35; 710/5; 710/33; 710/52
(58) Field of Classification Search .................. None
See application file for complete search history.

(56) References Cited

U.S. PATENT DOCUMENTS

2002/0194441 A1 * 12/2002 Chauvel et al. ............... 711/158
2006/0080477 A1    4/2006 Seigneret et al.

FOREIGN PATENT DOCUMENTS

JP    2005-141682    6/2005

OTHER PUBLICATIONS

Elliot, Rob, Oct. 2, 2002, HP, www.t10.org [online, accessed on Jan. 29, 2011], URL: http://www.t10.org/ftp/t10/document.02/02-403r0.pdf.*

* cited by examiner

*Primary Examiner* — Tariq Hafiz
*Assistant Examiner* — Scott Sun
(74) *Attorney, Agent, or Firm* — Young & Thompson

(57) ABSTRACT

A memory controller has a control unit receiving a transfer data from a transmission circuit and executing a burst transfer of the transfer data to a reception circuit. The transmission circuit transmits a first data of a first bit length for a first burst times by a burst transmission. The amount of the transfer data is equal to a product of the first bit length and the first burst times. The reception circuit receives a second data of a second bit length for a second burst times by a burst reception. When the amount of the first data received by the control unit becomes equal to or more than a product of the second bit length and the second burst times, the control unit transfers the received first data as the second data to the reception circuit, regardless of the number of the first data received by the control unit.

12 Claims, 7 Drawing Sheets

MEMORY CONTROLLER AND MEMORY CONTROL METHOD

CROSS REFERENCE TO RELATED APPLICATIONS

This is a division of copending application Ser. No. 11/634,120 filed on Dec. 6, 2006, which claims foreign priority to Japanese patent application No. 2005-354512. The content of each of these applications is hereby expressly incorporated by reference

BACKGROUND OF THE INVENTION

1. Field of the Invention

The present invention relates to a memory controller and a memory control method. In particular, the present invention relates to a memory controller supporting a burst transfer and a memory control method based on a burst transfer.

2. Description of the Related Art

In recent years, a DRAM (Dynamic Random Access Memory) capable of data inputting/outputting in synchronization with a clock signal, so-called an SDRAM (Synchronous DRAM) has become a mainstream of the RAM, since it allows for incorporation of a high-speed large-capacity memory into the system. The SDRAM has a burst mode in which data are input/output successively and is configured to enable the data input/output at a high-speed. In order to fully utilize such a high-speed access performance of the SDRAM, an interface circuit is necessary for connection with the SDRAM.

For example, Japanese Laid Open Patent Application JP-P2005-141682 discloses a high-speed memory access control device which controls access to a high-speed memory supporting a burst access. Described in the patent document is a case where a designated number of words are successively input/output by the burst access and there exists a page boundary of the memory during the burst access.

The high-speed memory access control device has an exceptional access information determining means, an address generating means, a switch control means and a timing control means. Based on the number of burst words and an access start address supplied from the outside, the exceptional access information determining means judges that the burst access is an exceptional access extending over successive two pages. In addition, the exceptional access information determining means determines the number of access words to be burst accessed with respect to each of the two pages. The address generating means generates a start address of the high-speed memory from which the burst access is started for each page. In addition, the address generating means changes the start address for switching the page to be accessed from the initial page to the next page. When it is judged that the burst access extends over the successive two pages, the switch control means controls the timing of changing the start address by the address generating means, based on the determined number of access words. The timing control means controls the access timing such that the burst access to the high-speed memory is started after the exceptional access information determining means judges the exceptional access and determines the number of access words.

An SDRAM is used as, for example, a main memory of a microprocessor system. FIG. 1 is a block diagram schematically showing a typical microprocessor system. A data writing operation in the microprocessor system based on a burst transfer will be described with reference to FIG. 1.

As shown in FIG. 1, the microprocessor system is provided with a CPU (Central Processing Unit) 11, a DMAC (Direct Memory Access Controller) 12, an input/output unit (I/O) 18, an SDRAM controller 17 and an SDRAM 20. The CPU 11, the DMAC 12, the SDRAM controller 17 and the input/output unit 18 are often integrated on one chip due to improvement in the integration degree of integrated circuits. In many cases, the microprocessor system is composed of two chips of a chip 10 and the SDRAM 20.

The CPU 11, the DMAC 12, the SDRAM controller 17 and the input/output unit 18 are connected with each other through a bus 15. The CPU 11 accesses the SDRAM 20 that is the main memory, executes a program, receives data from the input/output unit 18, and outputs data to the input/output unit 18. The DMAC 12 controls data transfer between memories and between memory input/output units without through the CPU 11. The SDRAM controller 17 controls the access to the SDRAM 20 by the CPU 11 or the DMAC 12.

As shown in FIG. 2, the SDRAM controller 17 includes a command buffer 91, a data write counter 97, a burst length judgment circuit 95, a burst timing control circuit 96, a data buffer 98 and a data read counter 99. A case of data writing to the SDRAM 20 will be mainly explained hereafter.

The command buffer 91 receives a command PCMD from the CPU 11 or the DMAC 12 through the bus 15. Also, the command buffer 91 receives a burst length PBL of a data to be transferred and an address PADR of a memory indicating the transfer destination, together with the command PCMD. The received command PCMD, the received burst length PBL and the received address PADR are output to the burst timing control circuit 96. At the same time, the received burst length PBL is output also to the burst length judgment circuit 95.

The data write counter 97 makes a count of the number of write data PDATA received by the data buffer 98, based on a data valid signal DVALD. The count value WCNT is output to the burst length judgment circuit 95. The burst length judgment circuit 95 makes a comparison between the count value WCNT from the data write counter 97 and the above-mentioned burst length PBL from the command buffer 91. If the count value WCNT becomes equal to the burst length PBL, the burst length judgment circuit 95 instructs the burst timing control circuit 96 to initiate a burst transfer.

In response to the instruction to initiate the burst transfer, the burst timing control circuit 96 controls a timing of the data transfer to the SDRAM 20. The burst timing control circuit 96 issues to the SDRAM 20 a command SCMD in accordance with a protocol for the data transfer, specifies a transfer destination address SADR, and instructs the data buffer 98 to output the data. Here, the burst timing control circuit 96 can detect completion of the data transfer by referring to a count value RCNT obtained by the data read counter 99. The number of data that can be burst transferred at a time is previously set in a mode register of the SDRAM 20. When the burst transfer continues, the burst timing control circuit 96 issues the command every number of data that can be burst transferred at a time.

Based on the data valid signal DVALD, the data buffer 98 receives the write data (transfer data) PDATA which are supplied through the bus 15 and are to be written to the SDRAM 20. The received write data PDATA are once stored in the data buffer 98. Then, the write data PDATA are output as data DQ to the SDRAM 20 in response to the instruction of the burst timing control circuit 96.

The data read counter 99 makes a count of the number of data output by the data buffer 98, and outputs the count value RCNT to the burst timing control circuit 96. Further, the data read counter 99 may output a read address to the data buffer 98.

FIG. 3 is a timing chart showing an example of the data writing operation. Referring to FIG. 3, an operation of the SDRAM controller 17 will be explained. It should be noted that the SDRAM controller 17, the bus 15 and the SDRAM 20 operate in synchronization with a clock CLK. A data width of the data supplied to the SDRAM controller 17 through the bus 15 is equal to a data width of the data transferred from the SDRAM controller 17 to the SDRAM 20. Each of reference numerals t0 to t21 (see (a) in FIG. 3) denotes a cycle of the clock CLK and is used for explaining timing. Further, a case is considered where the burst length that the SDRAM 20 can receive at a time is set to "4".

A command PCMD: WR, which is an instruction to write data to the SDRAM 20, is output to the bus 15 together with a burst length PBL: 8 and an address PADR (see (b) and (c) in FIG. 3). At the clock rising in the cycle t0, the command buffer 91 receives the command PCMD: WR, the burst length PBL: 8 and the address PADR.

During a period from the cycle t1 to the cycle t8, the data valid signal DVALD indicates that the write data PDATA on the bus 15 is valid (see (e) in FIG. 3). During the period from t1 to t8, the data buffer 98 receives the write data PDATA: D0 to D7 (see (d) in FIG. 3). Here, the data write counter 97 makes a count of the number of the received write data PDATA by counting the number of risings of the clock CLK during the period from t1 to t8 when the data valid signal DVALD is activated (see (f) in FIG. 3).

In the present example, the specified burst length is "8". When the count value WCNT obtained by the data write counter 97 becomes equal to "8", namely, at the cycle t8, the burst length judgment circuit 95 instructs the burst timing control circuit 96 to initiate the data transfer to the SDRAM 20. In response to the instruction to initiate the data transfer, the burst timing control circuit 96 outputs to the SDRAM 20 a command SCMD: ACT which instructs the SDRAM 20 to start operation. Here, the burst timing control circuit 96 outputs the command SCMD: ACT such that the SDRAM 20 can receive it at the cycle t10 (see (f) and (h) in FIG. 3).

The burst timing control circuit 96 stands by until the operation of the SDRAM 20 becomes ready. Then, the burst timing control circuit 96 outputs a command SCMD: WR instructing the data writing such that the SDRAM 20 can receive the command SCMD: WR at the cycle t13 (see (h) in FIG. 3). In response to the instruction by the burst timing control circuit 96, the data buffer 98 starts outputting of the stored write data (DQ: D0 to D7) from the cycle t13. The SDRAM 20 receives the command SCMD: WR at the clock rising in the cycle t13. From the clock rising in the next cycle t14, the SDRAM 20 receives the write data (DQ: D0 to D7) in synchronization with the clock CLK (see (h) and (i) in FIG. 3). In synchronization with the data output instruction for the data buffer 98, the data read counter 99 makes a count of the number of data output from the data buffer 98 (see (g) in FIG. 3).

When the data DQ: D3 that is the fourth word is output at the cycle t17, the count value RCNT obtained by the data read counter 99 becomes equal to the burst length "4" set in the mode register of the SDRAM 20. At the same time (cycle t17), the burst timing control circuit 96 outputs to the SDRAM 20 another command SCMD: WR instructing the data writing of the next four words. Since the second command SCMD: WR is output at this timing, the SDRAM 20 is able to receive data successively without receiving a new address.

The output of the second command SCMD: WR means that all commands necessary for the data transfer of the burst length "8" instructed to the SDRAM controller 17 are completely output. Therefore, the command buffer 91 can receive the next command PCMD. In the present example, the command buffer 91 can receive the next command PCMD at the cycle t18.

As for the former data transfer, the count value RCNT obtained by the data read counter 99 becomes "8" at the cycle t21. Therefore, the data read counter 99 notifies the burst timing control circuit 96 that the last data DQ: D7 is output. Thus, the data transfer is completed at this point of time.

SUMMARY OF THE INVENTION

The present invention has recognized the following points. According to the above-described data transfer instructed by the CPU 11 or the DMAC 12, the SDRAM controller 17 initiates the data writing with respect to the SDRAM 20 after receiving all the transfer data PDATA (D0 to D7) of the specified burst length ("8"). Therefore, a significant time lag occurs between the instruction by the CPU 11 or the DMAC 12 and the initiation of the data writing with respect to the SDRAM 20.

In a first aspect of the present invention, a memory controller is provided. The memory controller has a control unit and a data buffer configured to store a transfer data. The control unit receives the transfer data from a transmission circuit and executes a burst transfer of the transfer data to a reception circuit. The transmission circuit transmits a first data of a first bit length for a first burst times by a burst transmission. An amount of the transfer data from the transmission circuit is equal to a product of the first bit length and the first burst times. The reception circuit receives a second data of a second bit length for a second burst times by a burst reception. When an amount of the first data received by the control unit becomes equal to or more than a product of the second bit length and the second burst times, the control unit transfers the received first data as the second data to the reception circuit, regardless of a number of the first data received by the control unit.

In a second aspect of the present invention, a memory controller is provided. The memory controller is provided with a data buffer, a command split circuit, a burst length table and a burst timing control circuit. The data buffer is configured to store a transfer data of a first burst length. The first burst length is specified for every burst transfer. The command split circuit is configured to split a command indicating a burst transfer with the first burst length into commands each indicating a burst transfer with a split burst length, in accordance with a predetermined second burst length supported by a memory and burst transferred in response to one command issuance. The burst length table is configured to store the split burst length. The burst timing control circuit is configured to control a timing of a burst transfer of the transfer data such that the transfer data stored in the data buffer is burst transferred to the memory by the split burst length stored in the burst length table.

In a third aspect of the present invention, a memory control method is provided. The memory control method includes: (A) storing a transfer data of a first burst length in a data buffer, wherein the first burst length is specified for every burst transfer; (B) splitting a command indicating a burst transfer with the first burst length into commands each indicating a burst transfer with a split burst length, in accordance with a predetermined second burst length supported by a memory and burst transferred in response to one command issuance; (C) storing the split burst length in a burst length table; and (D) controlling a timing of a burst transfer of the transfer data such that the transfer data stored in the data buffer is burst transferred to the memory by the split burst length stored in the burst length table.

According to the present invention, the above-mentioned time lag in the burst data transfer is reduced. As a result, the time necessary for the burst data transfer can be reduced as a whole.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
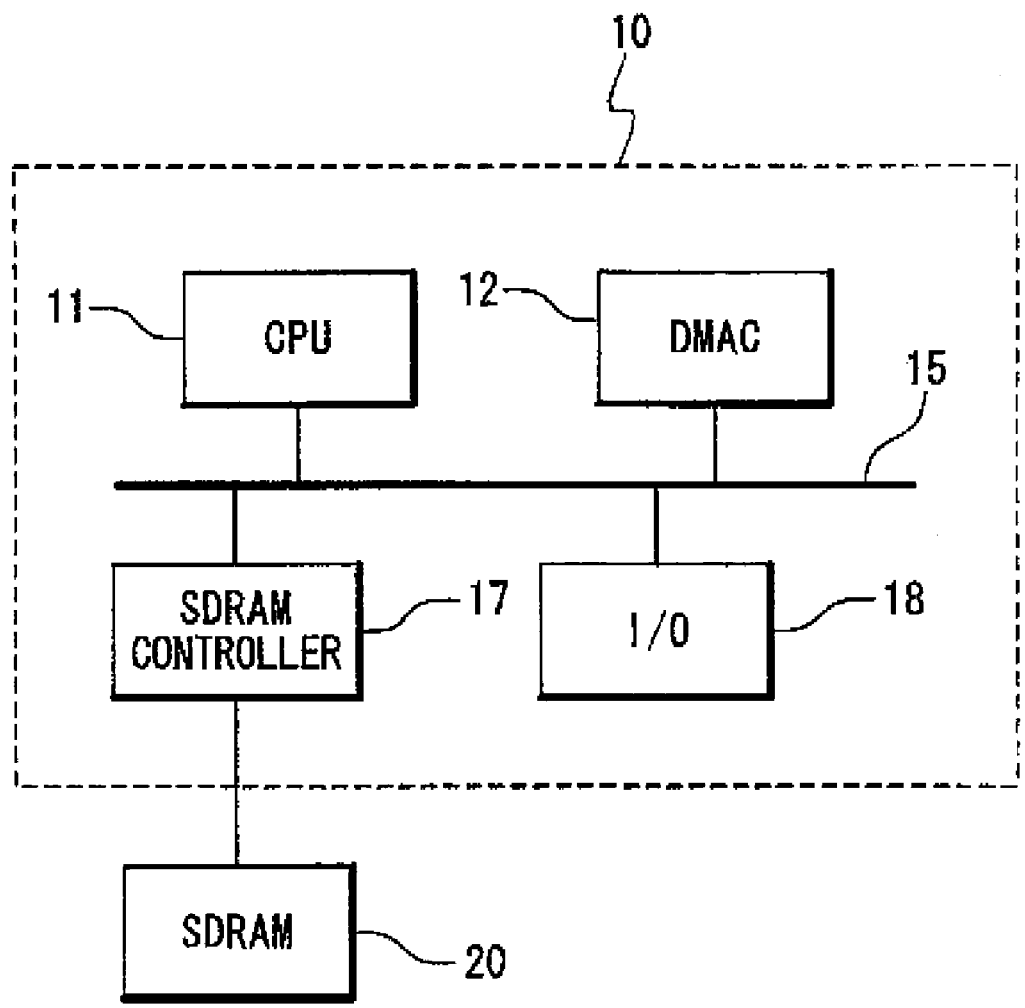
FIG. 1 is a block diagram schematically showing an example of a microprocessor system using an SDRAM as a main memory.
Figure 2:
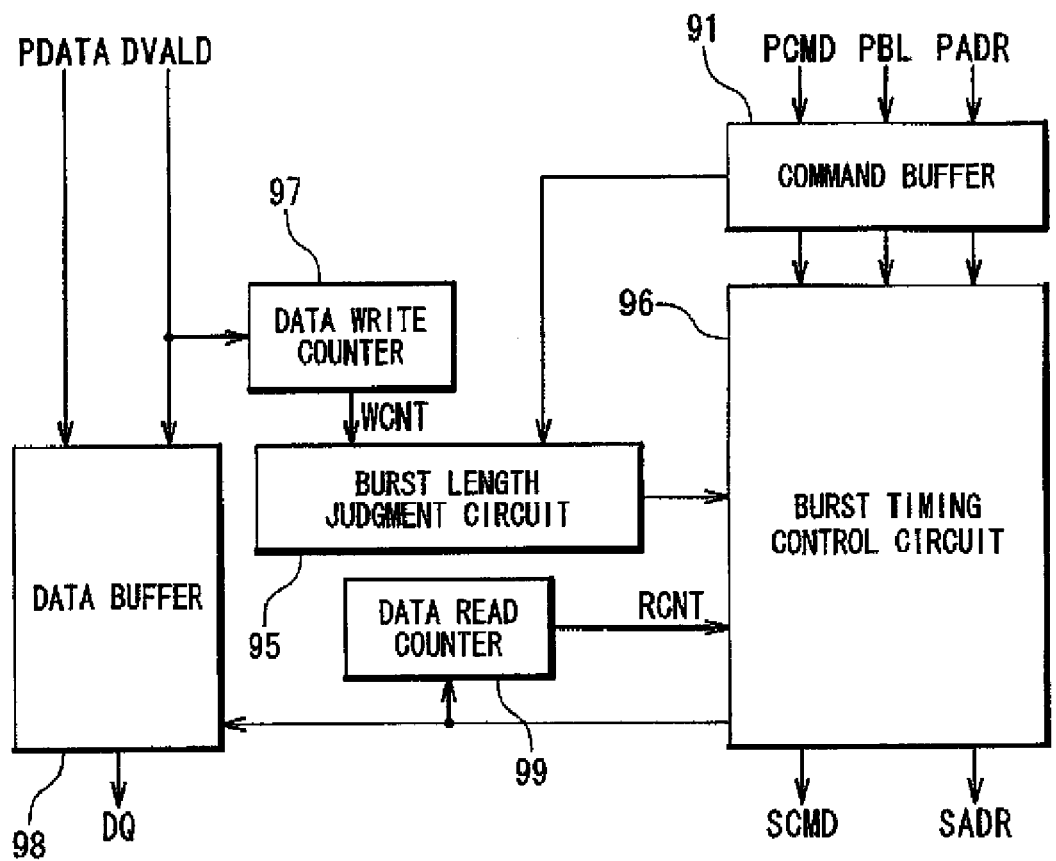
FIG. 2 is a block diagram showing a configuration of a conventional SDRAM controller.

FIG. 1 is a block diagram schematically showing a microprocessor system according an embodiment of the present invention. The microprocessor system uses an SDRAM as a main memory. More specifically, the microprocessor system is provided with a CPU (Central Processing Unit) 11, a DMAC (Direct Memory Access Controller) 12, an input/output unit (I/O) 18, an SDRAM controller 17 and an SDRAM 20.

The CPU 11, the DMAC 12, the SDRAM controller 17 and the input/output unit 18 are often integrated on one chip due to improvement in the integration degree of integrated circuits. In many cases, the microprocessor system is composed of two chips of a chip 10 and the SDRAM 20. The CPU 11, the DMAC 12, the SDRAM controller 17 and the input/output unit 18 are connected with each other through a bus 15. The SDRAM 20 is connected to the SDRAM controller 17.

The CPU 11 accesses the SDRAM 20 that is the main memory, executes a program, receives data from the input/output unit 18, and outputs data to the input/output unit 18. The DMAC 12 controls data transfer between memories and between memory input/output units without through the CPU 11. The SDRAM controller 17 controls the access to the SDRAM 20 by the CPU 11 or the DMAC 12. That is, the SDRAM controller 17 is a memory controller for controlling the access to the SDRAM 20. The CPU 11 or the DMAC (transmission circuit) can transmit data (transfer data) to the SDRAM controller 17 through the bus 15, and the SDRAM controller 17 can write the transfer data to the SDRAM 20 (reception circuit). Further, the SDRAM controller 17 can retrieve data (transfer data) from the SDRAM 20 (transmission circuit) and transfer the transfer data to the CPU 11 or the DMAC (reception circuit) through the bus 15. In the present embodiment, the SDRAM 20 and the SDRAM controller 17 support the burst access (burst transfer).

Figure 4:
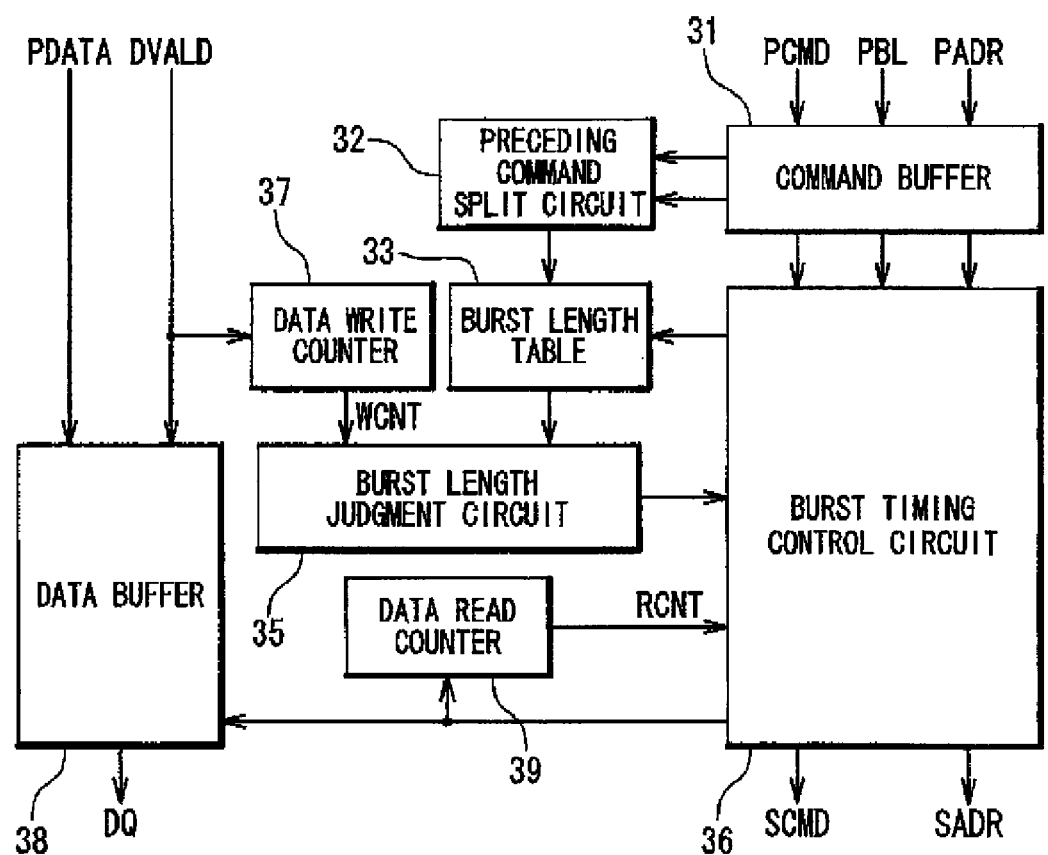
FIG. 4 is a block diagram showing a configuration of an SDRAM controller (memory controller) according to an embodiment of the present invention.

FIG. 4 is a block diagram showing a configuration of the SDRAM controller 17 according to the present embodiment. As shown in FIG. 4, the SDRAM controller (memory controller) 17 has a command buffer 31, a preceding command split circuit 32, a burst length table 33, a burst length judgment circuit 35, a burst timing control circuit 36, a data write counter 37, a data buffer 38, and a data read counter 39. For simplicity reason, the explanation is made herein considering that a data width of the bus 15 is identical with a data width of the SDRAM 20. Further, the SDRAM controller 17 is of course provided with a readout side circuit for reading data from the SDRAM 20, explanation thereof is omitted here. A write side circuit for transferring data to the SDRAM 20 will be explained hereafter.

The command buffer 31 receives a command PCMD from the CPU 11 or the DMAC 12 through the bus 15. Also, the command buffer 31 receives a burst length PBL of a data to be transferred and an address PADR of a memory indicating the transfer destination, together with the command PCMD. The command buffer 31 holds the command PCMD, the burst length PBL and the address PADR. The command PCMD, the burst length PBL and the address PADR are output to the burst timing control circuit 36. At the same time, the command PCMD, the burst length PBL and the address PADR are output also to the preceding command split circuit 32.

The data buffer 38 receives write data (transfer data) PDATA supplied from the CPU 11 or the DMAC 12 through the bus 15, and stores the received write data PDATA. The write data PDATA input to the data buffer 38 is loaded to the bus 15 together with a data valid signal DVALD indicating validity of the write data PDATA, in synchronization with a clock. That is, the data buffer 38 receives the write data PDATA based on the data valid signal PVALD. Therefore, the data write counter 37 can make a count of the number of write data PDATA received by the data buffer 38, based on the data valid signal DVALD. More specifically, the data write counter 37 counts the number of clocks in a period during which the data valid signal DVALD is activated. The count value WCNT is output to the burst length judgment circuit 35. Moreover, in response to an instruction from the burst timing control circuit 36, the data buffer 38 transfers the stored data PDATA as data DQ to the SDRAM 20. It should be noted that the data buffer 38 according to the present embodiment can be realized in various forms. For example, the data buffer 38 is realized in a form of the FIFO (First-In First-Out).

The preceding command split circuit 32 splits the command PCMD into a plurality of split commands. The command PCMD indicates a burst transfer with the burst length PBL (first burst length), while the split command indicates a burst transfer with a split burst length. The burst length PBL is a burst length of the transfer data to be transferred to the SDRAM 20 and is specified for every burst transfer. Here, the SDRAM 20 supports a burst transfer with a predetermined SDRAM burst length (second burst length) and can receive data of the SDRAM burst length in response to every one command. The SDRAM burst length is predetermined and stored in a mode register of the SDRAM 20. Based on the SDRAM burst length, the preceding command split circuit 32 splits the command PCMD into the split commands. In other words, the preceding command split circuit 32 splits the burst length PBL (first burst length) into split burst lengths, in accordance with the SDRAM burst length (second burst length). The burst length PBL, which indicates the number of data that the transfer source outputs in accordance with one command, is split into the split burst lengths each indicating the number of data that the SDRAM controller 17 transfers to the SDRAM 20 in response to one command issued for the SDRAM 20. As described above, the preceding command split circuit 32 determines the split burst length based on a first data width with which the transfer data PDATA is transmitted to the data buffer 38 and a second data width with which the transfer data DQ is transferred from the data buffer 38 to the SDRAM 20. The preceding command split circuit 32 stores the split burst lengths in the burst length table 33.

It should be noted here that the burst transfer with respect to the SDRAM 20 generally starts from a burst boundary such as an address 0, an address 8, an address 16 or the like in the SDRAM 20. However, when the start address of the burst transfer of the transfer data is different from the burst boundary, the preceding command split circuit 32 specifies the data length from the start address to the burst boundary as the first split burst length. In other words, the preceding command split circuit 32 determines the first split burst length such that the data from the start address to the burst boundary is transferred in one burst transfer. The data after the burst boundary are split in accordance with the above-mentioned SDRAM burst length. In this manner, the split burst lengths are determined based on not only the SDRAM burst length but also the above-mentioned address PADR (start address). Therefore, the split burst lengths are not necessarily equal to each other. The preceding command split circuit 32 splits the command PCMD by referring to the burst length PBL, the address PADR and the SDRAM burst length.

Figure 5:
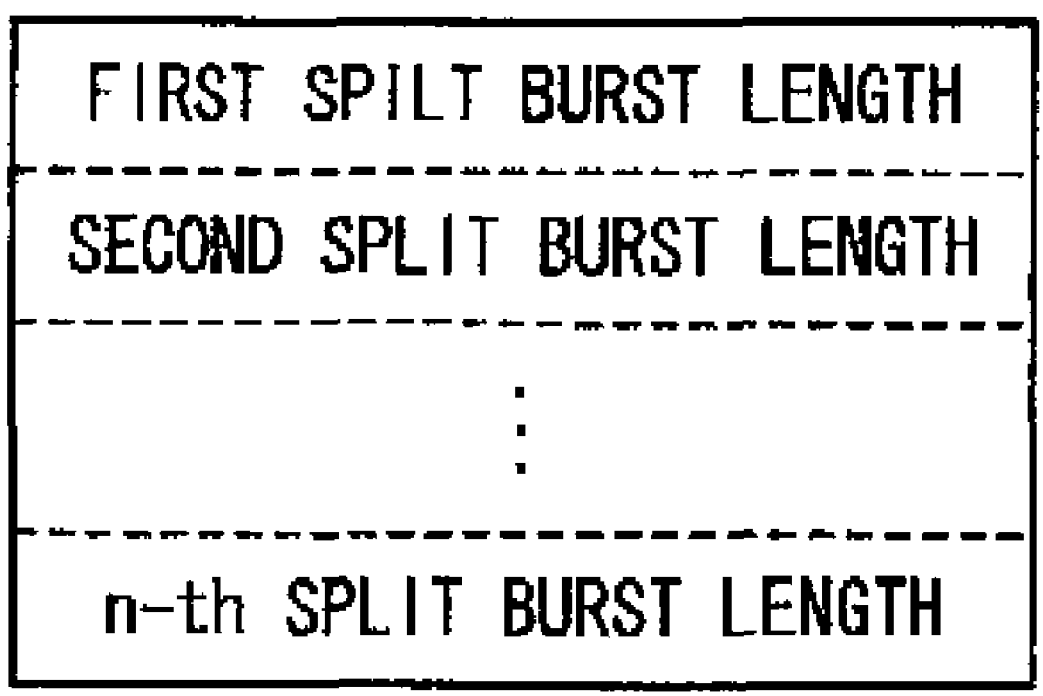
FIG. 5 is a schematic view showing a burst length table according to the embodiment of the present invention.

The burst length table 33 receives the split burst lengths from the preceding command split circuit 32 and stores them. FIG. 5 schematically shows an example of the burst length table 33 according to the present embodiment. Shown in FIG. 5 is a case where the burst length PBL is split into n split burst lengths. In this case, the split burst length group includes the first split burst length, the second split burst length, . . . , the n-th split burst length that are stored in the order of use. When a data transfer of a split burst length is completed, the next split burst length is moved up. Alternatively, the burst length table 33 has a pointer which indicates a split burst length to be used, and the position indicated by the pointer is changed.

The burst length judgment circuit 35 makes a comparison between the count value WCNT obtained by the data write counter 37 and each split burst length stored in the burst length table 33. If the count value WCNT becomes equal to or more than the split burst length, the burst length judgment circuit 35 instructs the burst timing control circuit 36 to initiate a burst transfer. In other words, when as much data as can be burst transferred to the SDRAM by one command are stored in the data buffer 38, the burst transfer is initiated.

In response to the instruction to initiate the burst transfer, the burst timing control circuit 36 controls a timing of the data transfer to the SDRAM 20. More specifically, the burst timing control circuit 36 controls the data transfer such that the transfer data DQ stored in the data buffer 38 is burst transferred to the SDRAM 20 by every split burst lengths stored in the burst length table 33. The burst timing control circuit 36 issues to the SDRAM 20 a command SCMD in accordance with a protocol for the data transfer, specifies a transfer destination address SADR, and instructs the data buffer 38 to output the data. Here, the burst timing control circuit 36 can detect completion of the data transfer by referring to a count value RCNT obtained by the data read counter 33. The SDRAM burst length, namely, the number of data that can be burst transferred at a time is previously set in the mode register of the SDRAM 20. When the burst transfer continues, the burst timing control circuit 36 issues the command every number of data that can be burst transferred at a time.

The data read counter 39 makes a count of the number of data output by the data buffer 38, and outputs the count value RCNT to the burst timing control circuit 36. Further, the data read counter 39 may output a read address to the data buffer 38.

Figure 6:
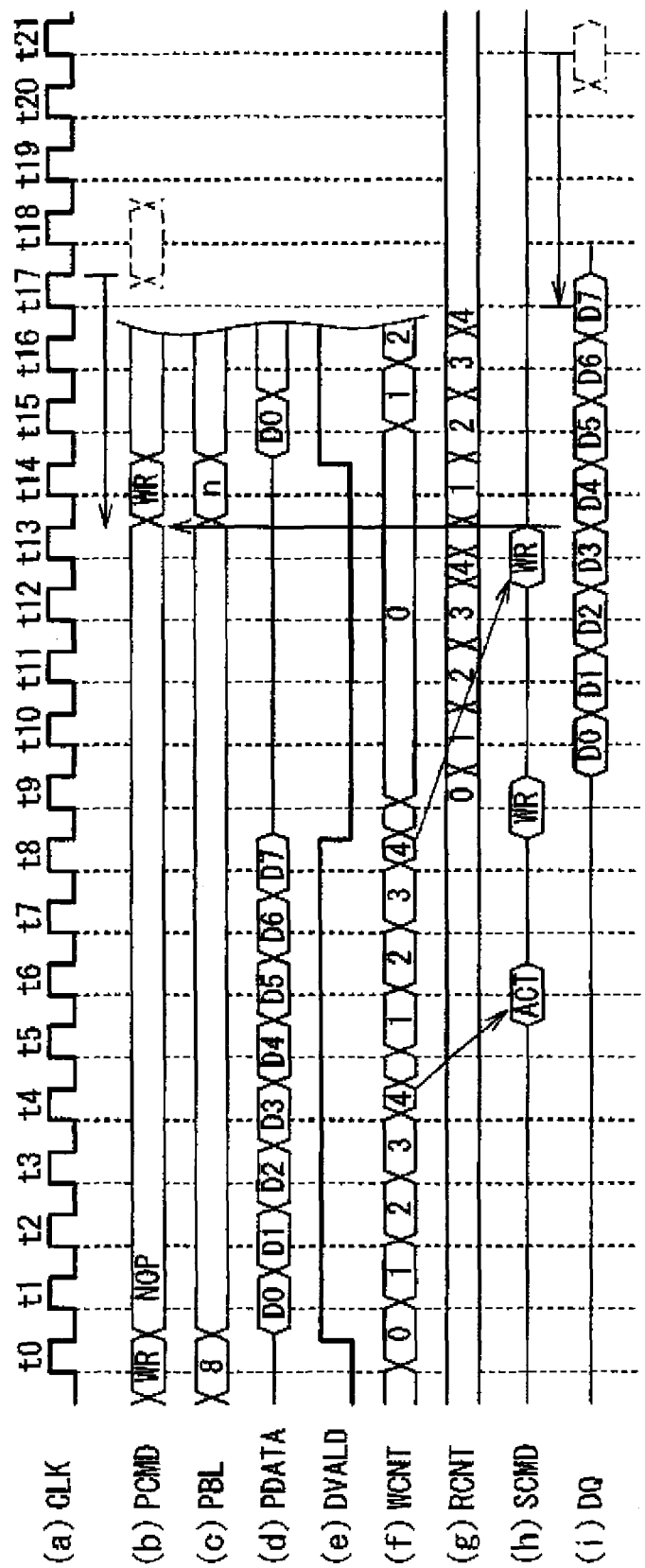
FIG. 6 is a timing chart showing an example of an operation of the SDRAM controller according to the embodiment of the present invention.

FIG. 6 is a timing chart showing an example of the data writing operation. Referring to FIG. 6, an operation of the SDRAM controller 17 will be explained. It should be noted that the SDRAM controller 17, the bus 15 and the SDRAM 20 operate in synchronization with a clock CLK. The data width of the data supplied to the SDRAM controller 17 through the bus 15 is equal to the data width of the data transferred from the SDRAM controller 17 to the SDRAM 20. Each of reference numerals t0 to t21 (see (a) in FIG. 6) denotes a cycle of the clock CLK and is used for explaining timing. Further, a case is considered where the SDRAM burst length that the SDRAM 20 can receive at a time is set to "4".

First, a protocol of the data writing to the SDRAM 20 will be explained briefly. The SDRAM controller 17 which controls the access to the SDRAM 20 outputs to the SDRAM 20 a RAS (Row Address Strobe) signal, a CAS (Column Address Strobe) signal, a CS (Chip Select) signal, a WES (Write Enable) signal, an address signal and the like. By a combination of these signals, a command for the SDRAM 20 and its parameter are determined. Each of these signals is not shown in FIG. 6, and only a timing of the command is shown. For example, a command corresponding to CS="L", RAS="L", CAS="H", and WE="H" is a command: ACT which instructs to initiate the memory operation. In this case, the SDRAM controller 17 outputs a row address and instructs the SDRAM 20 to take in the row address. A command corresponding to CS="L", RAS="H", CAS="L", WE="L" is a command: WR which instructs to take in a column address and write data. In this case, the SDRAM controller 17 outputs the column address.

Next, a procedure of the data writing to the SDRAM 20 in accordance with the burst transfer will be explained. The SDRAM controller 17 outputs a command: ACT indicating the initiation of the access to the SDRAM 20, and at the same time, gives a row address (a part of the address signal) to the SDRAM 20. Next, the SDRAM controller 17 outputs a command: WR indicating the initiation of the data writing operation, and at the same time, gives a column address (a part of the address signal) to the SDRAM 20. After a stand-by time set by a CAS latency, the write data are transferred to the SDRAM 20. The write data are transferred in synchronization with the clock CLK. In a DDR type or the like, another strobe signal may be used in order to transfer at a further high speed. In the present example, the data transfer of a simple type will be described.

The instruction of the address from the SDRAM controller 17 to the SDRAM 20 is not necessary while the write data is being transferred, which contributes to improvement of the transfer speed. The number of data (the SDRAM burst length) transferred in response to one write command SCMD: WR is set in the mode register of the SDRAM 20 previously. Explanation for procedures of setting the number of data in the mode register is omitted here.

Next, referring to FIG. 6, an example of the data write operation based on the burst transfer with respect to the SDRAM 20 by the SDRAM controller 17 will be explained.

A command PCMD: WR, which is an instruction to write the data to the SDRAM 20, is output to the bus 15 by the CPU 11 or the DMAC 12. Here, the command PCMD: WR is output together with a burst length PBL: 8 and a write destination address (start address) PADR. At the clock rising in the cycle t0, the command buffer 31 receives the command PCMD: WR, the burst length PBL: 8 and the write destination address PADR (see (b) and (c) in FIG. 6).

The command, the burst length and the address taken in the command buffer 31 are output to the preceding command split circuit 32. The preceding command split circuit 32 splits the input command, namely, splits the burst length PBL into appropriate split burst lengths. The preceding command split circuit 32 stores the split burst lengths in the burst length table 33, as shown in FIG. 5. Considered in the present example is a case where the write destination address (start address) PBL is consistent with a burst boundary. Moreover, the burst length PBL is "8" and the SDRAM burst length is "4". Therefore, the first split burst length of "4" and the second split burst length of "4" are stored in the burst length table 33. In this case, the transfer data of the burst length of "8" will be divided into two data of the burst length of "4", and respective of the two data will be separately burst transferred to the SDRAM 20, as described later. The first split burst length of "4" is first output to the burst length judgment circuit 35. After the data of the first split burst length is burst transferred to the SDRAM 20, the second split burst length of "4" is output to the burst length judgment circuit 35.

Meanwhile, the data buffer 38 takes in the transfer data (write data) supplied from the CPU 11 or the DMAC 12. More specifically, during a period from the cycle t1 to the cycle t8, the data valid signal DVALD indicates that the write data PDATA on the bus 15 is valid (see (e) in FIG. 6). Respective of the write data PDATA (D0 to D7) of the burst length PBL (8) are successively transmitted to the SDRAM controller 17 by a burst transmission. During the period from t1 to t8, the data buffer 38 receives the write data PDATA: D0 to D7 (see (d) in FIG. 6). The amount of the data supplied to the data buffer 38 is equal to a product of the bit length of each write data and the number of transmission times (8).

While the data buffer 38 receives the write data PDATA: D0 to D7, the data write counter 37 makes a count of the number of the received write data PDATA by counting the number of risings of the clock CLK during the period from t1 to t8 when the data valid signal DVALD is activated (see (f) in FIG. 6). The burst length judgment circuit 35 compares the count value WCNT output from the data write counter 37 and the first split burst length stored in the burst length table 33.

In the present example, the first split burst length is "4". When the count value WCNT obtained by the data write counter 37 becomes equal to "4", namely, at the cycle t4, the burst length judgment circuit 35 instructs the burst timing control circuit 36 to initiate the data transfer to the SDRAM 20. In addition, the burst length judgment circuit 35 instructs the burst length table 33 to output the next split burst length, i.e., the second split burst length. Furthermore, the burst length judgment circuit 35 instructs the data write counter 37 to reset the count value WCNT (see (f) in FIG. 6). The data write counter 37 instructed by the burst timing control circuit 36 resets the count value WCNT. Then, the data write counter 37 continues counting from the write data PDATA: D4 in the similar way.

In response to the first instruction at the cycle t4 to initiate the data transfer, the burst timing control circuit 36 outputs to the SDRAM 20 a command SCMD: ACT which instructs the SDRAM 20 to start operation. In the present example, the burst timing control circuit 36 outputs the command SCMD: ACT such that the SDRAM 20 can receive it at the cycle t6 (see (f) and (h) in FIG. 6). According to the present embodiment, as described above, the burst timing control circuit 36 initiates the burst transfer of the transfer data at the time when the amount of the transfer data stored in the data buffer 38 becomes equal to that corresponding to the first split burst length.

The burst timing control circuit 36 stands by until the operation of the SDRAM 20 becomes ready. Then, at the cycle t9 when the SDRAM 20 becomes ready, the burst timing control circuit 36 outputs a command SCMD: WR instructing the data writing (see (h) in FIG. 6). At the same time, the burst timing control circuit 36 instructs the data buffer 38 to output the stored write data from the cycle t9. In response to the instruction by the burst timing control circuit 36, the data buffer 38 starts outputting of the stored write data DQ: D0 to D7. The SDRAM 20 receives the command SCMD: WR at the clock rising in the cycle t9. From the clock rising in the next cycle t10, the SDRAM 20 receives the data output from the data buffer 38 in synchronization with the clock CLK (see (h) and (i) in FIG. 6). The data read counter 39 makes a count of the number of data output from the data buffer 38 (see (g) in FIG. 6).

While in the data write counter 37, the count value WCNT becomes equal to "4" again at the cycle t8. The count value WCNT of "4" is equal to the above-mentioned second split burst length. Therefore, at the cycle t8, the burst length judgment circuit 35 instructs the burst timing control circuit 36 to initiate the second data transfer to the SDRAM 20. However, at this timing, the burst timing control circuit 36 has not yet instructed the foregoing first data transfer (see (f) and (h) in FIG. 6). Thus, the second data transfer initiation instruction from the burst length judgment circuit 35 is put into a hold state.

The burst timing control circuit 36 outputs the second data transfer initiation instruction immediately before the completion of the first data transfer to the SDRAM 20. Namely, the burst timing control circuit 36 outputs to the SDRAM 20 another command SCMD: WR instructing the next burst data writing simultaneously with the output of the data DQ: D3, i.e., at the cycle t13 (see (h) and (i) in FIG. 6). Furthermore, the count value RCNT by the data read counter 39 is reset in order to be ready for the next burst data transfer (see (g) in FIG. 6). Therefore, the burst transfer to the SDRAM 20 is continued without interruption and thus the SDRAM 20 is able to receive the write data successively. During a period from the cycle t14 to t17, the data DQ: D4 to D7 are transferred from the data buffer 38 to the SDRAM 20. At the cycle t17, the count value RCNT by the data read counter 39 becomes "4" again, which means the completion of the burst data transfer corresponding to all of the split burst lengths stored in the burst length table 33. Thus, the burst data transfer is completed at this point of time (cycle t17).

Figure 3:
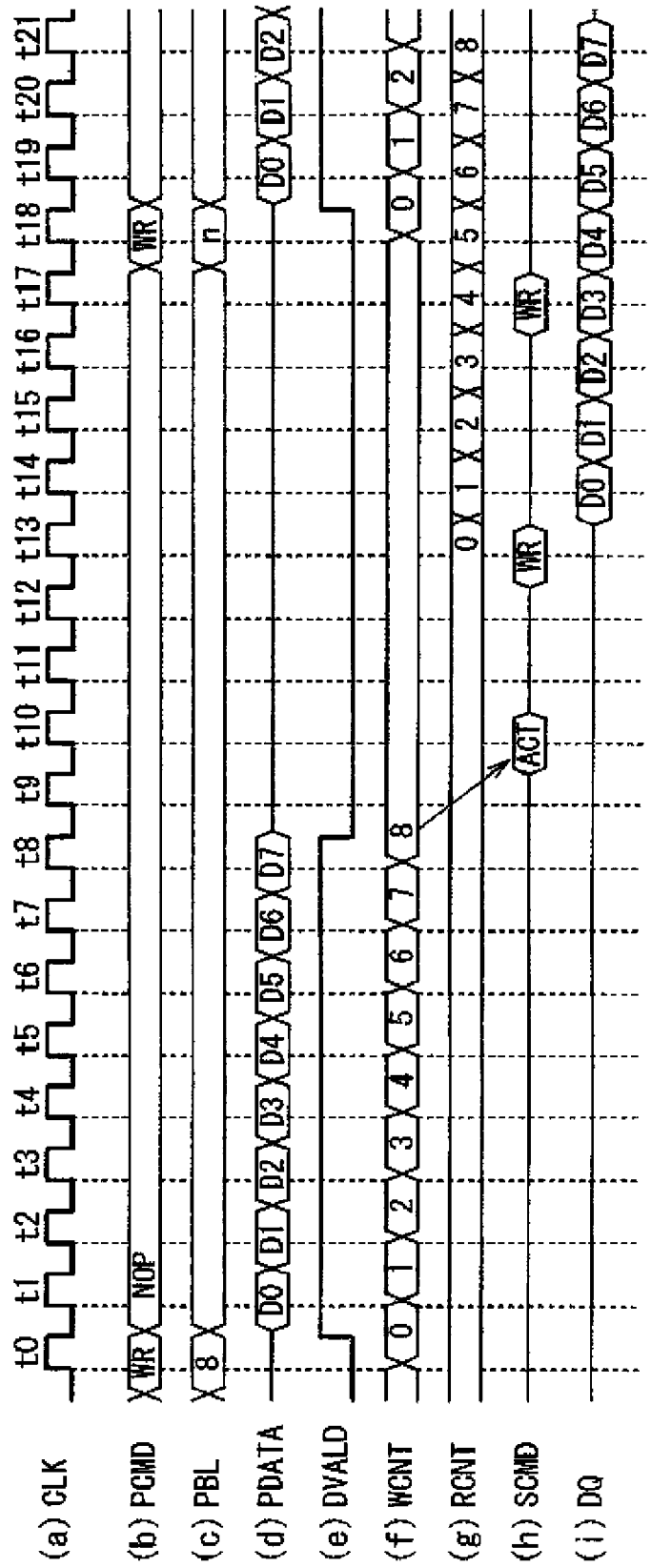
FIG. 3 is a timing chart showing an example of an operation of the conventional SDRAM controller.

According to the present embodiment, as described above, the data writing operation of the SDRAM 20 is initiated at the time when the amount of write data taken in the data buffer 38 satisfies the split burst length, even though all of the write data (D0 to D7) is not yet supplied to the data buffer 38. Therefore, the time lag between the instruction by the CPU 11 or the DMAC 12 and the initiation of the data writing with respect to the SDRAM 20 is reduced as compared with the conventional technique. In the conventional technique, the burst transfer of the whole transfer data is completed at the cycle t21, as shown in FIG. 3. On the other hand, in the present example, the burst transfer of the whole transfer data is completed at the cycle t17, as shown in FIG. 6. In this manner, the time necessary for the burst data transfer can be reduced as a whole.

Moreover, the output of the second command SCMD: WR at the cycle t13 means that all commands necessary for the data transfer of the burst length "8" instructed to the SDRAM controller 17 are completely output. Therefore, the command buffer 31 can receive the next command PCMD. In the present example, the command buffer 31 can receive the next command PCMD at the cycle t14, which is earlier than the timing (t18) in the conventional technique.

Figure 7:
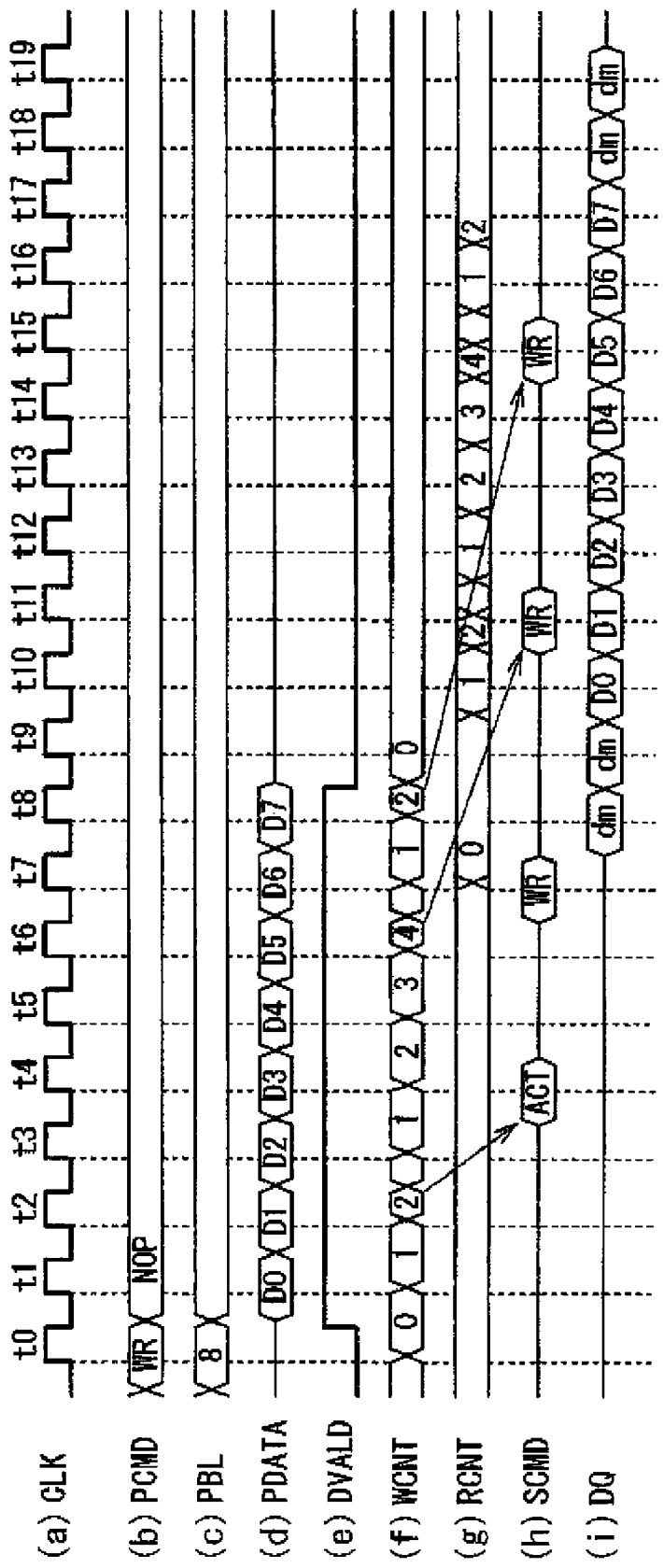
FIG. 7 is a timing chart showing another example of an operation of the SDRAM controller according to the embodiment of the present invention.

FIG. 7 is a timing chart showing another example of the data writing operation of the SDRAM controller 17. In the present example, the write start address is not present at the burst boundary and is different from the burst boundary. For example, the write start address is shifted by 2-words from the burst boundary. Referring to FIG. 7, an example of the data writing operation based on the burst transfer will be explained.

A command PCMD: WR, which is an instruction to write the data to the SDRAM 20, is output to the bus 15 by the CPU 11 or the DMAC 12. Here, the command PCMD: WR is output together with a burst length PBL: 8 and a write destination address (start address) PADR. At the clock rising in the cycle t0, the command buffer 31 receives the command PCMD: WR, the burst length PBL: 8 and the write destination address PADR (see (b) and (c) in FIG. 7).

The command, the burst length and the address taken in the command buffer 31 are output to the preceding command split circuit 32. The preceding command split circuit 32 splits the input command, namely, splits the burst length PBL into appropriate split burst lengths. The preceding command split circuit 32 stores the split burst lengths in the burst length table 33. In the present example, the write start address is different from the burst boundary. Therefore, the data length (2-words) from the write start address to the burst boundary is set to the first split burst length. In the present example, the first split burst length is set to "2".

With the first split burst length of "2", the address reaches the burst boundary. Therefore, the remaining burst length is split in accordance with the SDRAM burst length ("4") that is set in the mode register of the SDRAM 20. In the present example, the second split burst length is set to "4". Here, 2-words are still remaining and thus the third split burst length is set to "2". Thus, the data transfer is executed over three times. The first split burst length of "2", the second split burst length of "4" and the third split burst length of "2" are stored in the burst length table 33. The first split burst length of "2" is first output to the burst length judgment circuit 35.

Meanwhile, during a period from the cycle t1 to the cycle t8, the data valid signal DVALD indicates that the write data PDATA on the bus 15 is valid. During the period from t1 to t8, the data buffer 38 receives the write data PDATA: D0 to D7 (see (d) and (e) in FIG. 7). The data write counter 37 makes a count of the number of the received write data PDATA by counting the number of risings of the clock CLK during the period from t1 to t8 when the data valid signal DVALD is activated (see (f) in FIG. 7). The burst length judgment circuit 35 compares the count value WCNT output from the data write counter 37 and the first split burst length stored in the burst length table 33.

In the present example, the first split burst length is "2". When the count value WCNT obtained by the data write counter 37 becomes equal to "2", namely, at the cycle t2, the burst length judgment circuit 35 instructs the burst timing control circuit 36 to initiate the data transfer to the SDRAM 20. In addition, the burst length judgment circuit 35 instructs the burst length table 33 to output the next split burst length, i.e., the second split burst length. Furthermore, the burst length judgment circuit 35 instructs the data write counter 37 to reset the count value WCNT (see (f) in FIG. 7). The data write counter 37 instructed by the burst timing control circuit 36 resets the count value WCNT. Then, the data write counter 37 continues counting from the write data PDATA: D2 in the similar way.

In response to the first instruction at the cycle t2 to initiate the data transfer, the burst timing control circuit 36 outputs to the SDRAM 20 a command SCMD: ACT which instructs the SDRAM 20 to start operation. In the present example, the burst timing control circuit 36 outputs the command SCMD: ACT such that the SDRAM 20 can receive it at the cycle t4 (see (f) and (h) in FIG. 7).

After that, the burst timing control circuit 36 stands by until the operation of the SDRAM 20 becomes ready. Then, at the cycle t7 when the SDRAM 20 becomes ready, the burst timing control circuit 36 outputs a command SCMD: WR instructing the data writing (see (h) in FIG. 7). At the same time, the burst timing control circuit 36 instructs the data buffer 38 to output the stored write data from the cycle t10 after two dummy data (dm) as much as 2-words from the write start address to the burst boundary are output (see (i) in FIG. 7). The SDRAM 20 receives the command SCMD: WR at the clock rising in the cycle t7. From the clock rising in the next cycle t8, the SDRAM 20 receives the two dummy data (dm) and the data output from the data buffer 38 in synchronization with the clock CLK (see (h) and (i) in FIG. 7). It should be noted that the dummy data (dm) from the write start address to the burst boundary are not actually written into the SDRAM 20. The data from D0 are written into the SDRAM 20.

The data read counter 39 makes a count of the number of data output from the data buffer 38 (see (g) in FIG. 7). When the write data DQ: D0 is output, the count value RCNT becomes "1". When the data DQ: D1 is output, the count value RCNT becomes "2". The data read counter 39 is reset when a command SCMD: WR for the SDRAM 20 is issued.

While in the data write counter 37, the count value WCNT becomes equal to "4" at the cycle t6. The count value WCNT of "4" is equal to the above-mentioned second split burst length. Therefore, at the cycle t6, the burst length judgment circuit 35 instructs the burst timing control circuit 36 to initiate the second data transfer to the SDRAM 20. However, at this timing, the burst timing control circuit 36 has not yet instructed the foregoing first data transfer (see (f) and (h) in FIG. 7). Thus, the second data transfer initiation instruction from the burst length judgment circuit 35 is put into a hold state.

The burst timing control circuit 36 outputs the second data transfer initiation instruction immediately before the completion of the first data transfer to the SDRAM 20. Namely, the burst timing control circuit 36 outputs to the SDRAM 20 another command SCMD: WR instructing the next burst data writing simultaneously with the output of the data DQ: D1, i.e., at the cycle t11 (see (h) and (i) in FIG. 7). Furthermore, the count value RCNT by the data read counter 39 is reset in order to be ready for the next burst data transfer (see (g) in FIG. 7). Therefore, the burst transfer to the SDRAM 20 is continued without interruption and thus the SDRAM 20 is able to receive the write data successively. During a period from the cycle t12 to t15, the data DQ: D2 to D5 are transferred from the data buffer 38 to the SDRAM 20. At the cycle t15, the count value RCNT by the data read counter 39 becomes "4".

Similarly, the burst timing control circuit 36 outputs the third data transfer initiation instruction immediately before the completion of the second data transfer to the SDRAM 20. Namely, the burst timing control circuit 36 outputs to the SDRAM 20 still another command SCMD: WR simultaneously with the output of the data DQ: D5, i.e., at the cycle t15 (see (h) and (i) in FIG. 7). Furthermore, the count value RCNT by the data read counter 39 is reset in order to be ready for the next burst data transfer (see (g) in FIG. 7). Therefore, the burst transfer to the SDRAM 20 is continued without interruption and thus the SDRAM 20 is able to receive the write data successively.

During a period from the cycle t16 to t17, the data DQ: D6 to D7 are transferred from the data buffer 38 to the SDRAM 20, followed by the dummy data transfer. At the cycle t17, the count value RCNT by the data read counter 39 becomes "2" which is equal to the third split burst length. Thus, the burst data transfer corresponding to all of the split burst lengths stored in the burst length table 33 is completed. The transfer of the dummy data is executed till the burst boundary and is finished at the cycle t19. As compared with the conventional technique, the time necessary for the burst data transfer can be reduced as a whole according to the present example. A great time reduction can be attained by the circuit according to the present embodiment.

In the present embodiment, it is considered that the data write counter 37 is reset after the split burst length is counted. As the data to be stored in the burst length table 33, split position of the burst data may be used instead of the split burst length. In this case, the data write counter 37 executes the counting continuously without being reset. When the number indicating the position of the split burst data is set as the burst length in the burst length table 33, the configuration of the burst length judgment circuit 35 is simplified. Also, in the foregoing example, the data write counter 37 is designed to count the number of the data transfer times. Alternatively, the data write counter 37 may be designed to detect the amount of the data transfer.

Explained in the present embodiment is the case where the data width of the bus 15 (the data width of the data PDATA) is equal to the data width of the SDRAM 20 (the data width of the data DQ). However, the two data widths can be different from each other. For example, let us consider a case where that data width on the CPU 11 side is 64 bits ($8=2^3$ bytes) and the data width on the SDRAM 20 side is 32 bits ($4=2^2$ bytes). Further, on the SDRAM 20 side, 4-words (32 bits/word) are burst transferred in response to one command SCMD: WR. When the burst length on the CPU 11 side is 8-words (64 bits/word), the transferred bytes are 64 bytes. On the SDRAM 20 side, 4-words (=16 bytes) are burst transferred in response to one command SCMD: WR. Therefore, the command SCMD: WR is issued for four times with respect the SDRAM 20, and a total of 16-words (32 bits/word) are burst transferred to the SDRAM 20.

Normally, the data width is designed to be $2^i$ bytes (i=0, 1, . . . ). The SDRAM burst length is also $2^j$ (j=0, 1, . . . ) such as 2, 4 or the like. Since the data transfer speed on the bus 15 is high, the data buffer 38 is designed based on the data width of the bus 15. The data width of the data transferred through the bus 15 is $2^m$ bytes. When the number of the data transfers is given by "B", the amount of the write data supplied to the data buffer 38 are given by "$B \times 2^m$ bytes". On the other hand, the data width of the SDRAM 20 (the data DQ) is $2^n$ bytes. In this case, the data DQ is read out from the data buffer 38 every data width "$2^n$ bytes". When the SDRAM burst length is $2^j$, the SDRAM 20 receives data of "$2^{j+n}$ bytes" by one burst writing. Therefore, if the write start address in the transfer destination is present on the burst boundary, the number of the write commands SCMD: WR issued with respect to the SDRAM 20 is given by "the burst length$\times 2^m/2^{n+j}$ (the burst length$\times 2^{m-n-j}$).

This means that the number of write bytes can be counted if the data write counter 37 of the data buffer 38 includes a counter for counting the burst length and a m-bit counter. It also means that the number of read bytes can be counter if the data read counter 39 includes a j-bit counter for counting the SDRAM burst length and an n-bit counter. Therefore, if $2^{n+j}$ is set to the burst length table 33 and the number of bytes ($2^m \times B$) of the stored data is compared, the burst length judgment circuit 35 can judge whether or not the data transfer to the SDRAM 20 can be initiated. In other words, the data stored in the data buffer 38 is up to $2^m \times B$ bytes, and when the amount of the stored data becomes equal to or more than $2^{n+j}$ bytes, the data transfer to the SDRAM 20 can be initiated. The number of transfers "B" in this case can be given by "$B = 2^{n+j}/2^m = 2^{n+j-m}$", and the following cases are considered:

$$n+j>m: \quad (1)$$

In one-time data transfer through the bus 15, the burst transfer to the SDRAM 20 is not possible. When the data transfer to the data buffer 38 through the bus 15 is executed for $B=2^{n+j-m}$ times and the data is store, it is instructed to initiate the burst transfer to the SDRAM 20. For example, in the foregoing embodiment where the data width of the bus 15 and the data width of the SDRAM 20 are identical, the command SCMD: WR with respect to the SDRAM 20 is initiated when the count value WCNT obtained by the data write counter 37 becomes $B=2^j$. Since j=2 in the foregoing example, it is understood that the initiation takes place every B=4.

$$n+J<m: \quad (2)$$

The data width of the bus 15 is sufficiently large. The burst transfer to the SDRAM 20 as many as $2^{m-n-j}$ times is possible for one-time data transfer through the bus 15.

Since the data transfer speed of the bus 15 is high, the data buffer 38 is designed based on the data width of the bus 15. Therefore, conversion of the data width is executed when the data read out from the data buffer 38 is transferred to the SDRAM 20. In a case where the data width of the SDRAM 20 is narrower than the data width of the data buffer 38, the data readout from the data buffer 38 are transferred to the SDRAM 20 in plural times. Such an operation can be realized by providing a multiplexer having a data width corresponding to the data width of the SDRAM 20. On the other hand, in a case where the data width of the SDRAM 20 is wider than the data width of the data buffer 38, a plurality of data readout from the data buffer 38 are combined and then transferred to the SDRAM 20. Such an operation can be realized by providing a register for holding the read data till the next readout. Furthermore, if the transfer destination address is different from the burst boundary, the dummy data transfer can be realized by providing a counter for counting the offset value of the address with respect to the burst boundary. The timing of reading out the transfer data from the data buffer 38 is determined by this counter. That is, the counter starts counting from the initiation of the burst transfer to the SDRAM 20, and when the count value reaches the offset value, the data transfer from the data buffer 38 is initiated. Thus, the data stored in the data buffer 38 is transferred to the SDRAM 20 after the dummy data transfer.

It is preferable that information indicating the respective data widths is set as necessary in the preceding command split circuit 32 and the burst timing control circuit 36. An external terminal may be provided for specifying the information indicating the respective data widths. A register may be provided for storing the information indicating the respective data widths. A register for storing setting conditions of the data widths may be provided so as to allow setting by commands from high-level devices.

In the present embodiment, the command buffer 31, the preceding command split circuit 32, the burst length table 33, the burst length judgment circuit 35, the burst timing control circuit 36, the data write counter 37, the data buffer 38, and the data read counter 39 function as a "control unit". The control unit receives the transfer data from a transmission circuit and executes a burst transfer of the transfer data to a reception circuit. The transmission circuit such as the CPU 11 or the DMAC 12 transmits a first data of a first bit length for a first burst times by a burst transmission. The amount of the transfer data from the transmission circuit is equal to a product of the first bit length and the first burst times. The reception circuit receives a second data of a second bit length for a second burst times by a burst reception. When the amount of the first data received by the control unit becomes equal to or more than a product of the second bit length and the second burst times, the control unit transfers the received first data as the second data to the reception circuit, regardless of a number of the first data received by the control unit.

As described above, according to the present embodiment, the burst transfer to the SDRAM 20 can be initiated at a timing when the data amount that can be burst transferred to the SDRAM 20 is taken in the data buffer 38. Therefore, the above-described "time-lag" is reduced as compared with the conventional circuit which initiates the burst transfer after all the transfer data are taken in the data buffer. Furthermore, since the data on the CPU 11 side are taken while writing the stored data into the SDRAM 20, the capacity of the data buffer 38 can be designed to be smaller.

It is apparent that the present invention is not limited to the above embodiment and may be modified and changed without departing from the scope and spirit of the invention.

The invention claimed is:

1. A memory controller comprising:
   a data buffer configured to receive a transfer data transmitted from a transmission circuit by a first burst transmission of first burst times in which said transmission circuit transmits data having a first bit length, and to store said transfer data, an amount of said transfer data stored in said data buffer in said first burst transmission being a product of said first bit length and said first burst times; and
   a control circuit coupled to said data buffer to transmit said transfer data from said data buffer to a reception circuit capable of receiving said transfer data in a second burst transmission of second burst times in which said reception circuit receives data having a second bit length, an amount of said transfer data received by said reception circuit in said second burst transmission being a product of said second bit length and said second burst times,
   wherein said control circuit issues a command indicating an initiation of an access of said transmission circuit to said reception circuit before said amount of said transfer data stored in said data buffer in said first burst transmission becomes equal to said product of said first bit length and said first burst times, when said amount of said transfer data stored in said data buffer in said first burst transmission becomes equal to or more than said product of said second bit length and said second burst times,
   wherein said data buffer has already started to store said transfer data from said transmission circuit before said control circuit issues said command to said reception circuit.

2. The memory controller according to claim 1, wherein said control circuit issues another command indicating an initiation of writing said transfer data to said reception circuit after issuing said command.

3. The memory controller according to claim 2, wherein said control circuit issues said another command before said amount of said transfer data stored in said data buffer in said first burst transmission becomes equal to said product of said first bit length and said first burst times.

4. The memory controller according to claim 2, wherein said control circuit issues said another command after said amount of said transfer data stored in said data buffer in said first burst transmission becomes equal to said product of said first bit length and said first burst times.

5. The memory controller according to claim 1, wherein said first bit length is equal to said second bit length.

6. The memory controller according to claim 1, wherein said first burst times are larger than said second burst times.

7. The memory controller according to claim 1, wherein said transmission circuit is a CPU.

8. The memory controller according to claim 1, wherein said reception circuit is a SDRAM.

9. The memory controller according to claim 1, further comprising:
   a data write counter configured to count burst transmission times indicating an amount of said transfer data stored in said data buffer;
   a burst length table configured to store said second burst times; and
   a burst length judgment circuit coupled to said data write counter and said burst length table to compare said burst transmission times with said second burst times to instruct said control unit to initiate said second burst transmission when said burst transmission times becomes equal to or more than said second burst times whereas said burst transmission times is less than said first burst times.

10. The memory controller according to claim 9, wherein said control circuit issues said command in response to said instruction from said burst length judgment circuit.

11. The memory controller according to claim 1, further comprising a register configured to store information indicating said first bit length and said second bit length.

12. The memory controller according to claim 1, further comprising an external terminal through which said first bit length and said second bit length are specified.

* * * * *